United States Patent
Hoshino et al.

(10) Patent No.: US 9,710,319 B2
(45) Date of Patent: Jul. 18, 2017

(54) INFORMATION PROCESSING APPARATUS AND INFORMATION COLLECTION METHOD

(71) Applicant: FUJITSU LIMITED, Kawasaki-shi, Kanagawa (JP)

(72) Inventors: Hiroyuki Hoshino, Nagano (JP); Kenji Iwasawa, Nagano (JP); Masako Nishiyama, Numazu (JP); Yusuke Kurasawa, Nagano (JP)

(73) Assignee: FUJITSU LIMITED, Kawasaki (JP)

( * ) Notice: Subject to any disclaimer, the term of this patent is extended or adjusted under 35 U.S.C. 154(b) by 236 days.

(21) Appl. No.: 14/507,943

(22) Filed: Oct. 7, 2014

(65) Prior Publication Data
US 2015/0121151 A1    Apr. 30, 2015

(30) Foreign Application Priority Data
Oct. 24, 2013    (JP) ................................. 2013-220963

(51) Int. Cl.
*G06F 11/00*    (2006.01)
*G06F 11/07*    (2006.01)

(52) U.S. Cl.
CPC ........ *G06F 11/0778* (2013.01); *G06F 11/073* (2013.01)

(58) Field of Classification Search
CPC ............. G06F 11/3409; G06F 11/3495; G06F 11/0787; G06F 11/079; G06F 2201/87; G06F 2201/885; H04L 41/0631; H04L 41/22; H04L 67/2842
See application file for complete search history.

(56) References Cited

U.S. PATENT DOCUMENTS 5,282,267 A * 1/1994 Woo, Jr. ................. G06Q 40/02
                                                      101/485
6,658,652 B1 * 12/2003 Alexander, III ...... G06F 9/5016
                                                      707/999.202
(Continued)

FOREIGN PATENT DOCUMENTS

JP    04-116738    4/1992
JP    05-233383    9/1993
(Continued)

OTHER PUBLICATIONS

Agarwal, "ATUM: A New Technique for Capturing Address Traces Using Microcode", 1986, IEEE, p. 1-9.*
(Continued)

*Primary Examiner* — Bryce Bonzo
*Assistant Examiner* — Jeison C Arcos
(74) *Attorney, Agent, or Firm* — Fujitsu Patent Center

(57) ABSTRACT

An information processing apparatus includes a volatile memory and a nonvolatile memory. An area setting unit sets, upon detection of an abnormality in the information processing apparatus, a work area in a storage area except a collection target area of investigation information used for investigation of a cause of the occurrence of the abnormality, in a storage area of the volatile memory. An information collection unit executes a procedure of collecting investigation information from the volatile memory and storing the same into the nonvolatile memory by using the set work area.

13 Claims, 9 Drawing Sheets

(56) References Cited

U.S. PATENT DOCUMENTS

| | | | |
|---|---|---|---|
| 2002/0049853 A1* | 4/2002 | Chu | H04L 12/58 709/237 |
| 2003/0217110 A1* | 11/2003 | Weiss | H04L 67/12 709/207 |
| 2005/0172271 A1* | 8/2005 | Spertus | G06F 11/3664 717/125 |
| 2005/0268053 A1* | 12/2005 | Sexton | G06F 11/3636 711/159 |
| 2006/0085156 A1* | 4/2006 | Kolawa | G06F 12/0253 702/119 |
| 2007/0288500 A1* | 12/2007 | Sarnowicz | G06F 11/3409 |
| 2008/0294936 A1* | 11/2008 | Hogstrom | G06F 11/366 714/6.13 |
| 2009/0216967 A1 | 8/2009 | Sugawara | |
| 2013/0185600 A1* | 7/2013 | MacFarlane | G06F 11/0787 714/45 |
| 2013/0297977 A1* | 11/2013 | MacFarlane | G06F 11/0787 714/45 |
| 2015/0234700 A1* | 8/2015 | Qin | G06F 11/0778 714/38.11 |

FOREIGN PATENT DOCUMENTS

| | | |
|---|---|---|
| JP | 10-49407 A | 2/1998 |
| JP | 2007-172414 A | 7/2007 |
| JP | 2007-207213 A | 8/2007 |
| JP | 2009-205254 | 9/2009 |
| JP | 2011-39632 A | 2/2011 |

OTHER PUBLICATIONS

Kernel.org, "Chapter 4 Process Address Space" Dec. 2007, Kernel.org, p. 1-25.*

Japanese Office Action issued May 2, 2017 for corresponding Japanese Patent Application No. 2013-220963, with English Translation, 6 pages.

* cited by examiner

144 INVESTIGATION INFORMATION MANAGEMENT TABLE

| RESOURCE ID | 3 |
|---|---|

144a COLLECTION INSTRUCTION INFORMATION

| OPERATION MODE | NORMAL OPERATION |
|---|---|
| PRIORITY LOWER LIMIT | 4 |
| OPERATION MODE | DEBUG |
| PRIORITY LOWER LIMIT | 7 |

144b INVESTIGATION INFORMATION LIST

| INVESTIGATION INFORMATION ID | SIZE |
|---|---|
| INVESTIGATION INFORMATION #1 | 1KByte |
| INVESTIGATION INFORMATION #2 | 5KByte |
| INVESTIGATION INFORMATION #3 | 20KByte |
| INVESTIGATION INFORMATION #4 | 70KByte |
| INVESTIGATION INFORMATION #5 | 10MByte |
| INVESTIGATION INFORMATION #6 | 100MByte |
| INVESTIGATION INFORMATION #7 | 500MByte |

FIG. 6

INFORMATION PROCESSING APPARATUS AND INFORMATION COLLECTION METHOD

CROSS-REFERENCE TO RELATED APPLICATION

This application is based upon and claims the benefit of priority of the prior Japanese Patent Application No. 2013-220963, filed on Oct. 24, 2013, the entire content of which are incorporated herein by reference.

FIELD

The embodiments discussed herein relate to an information processing apparatus and an information collection method.

BACKGROUND

One of the abnormalities in processing occurring in a computer is memory leak. The memory leak is the phenomenon that a memory area, which a program occupies for the purpose of processing, remains unreleased for some reason and the available memory area decreases. In order to investigate the cause of the occurrence of the memory leak, it is useful to sample the memory dump information in a state where the memory leak has occurred. However, in general, the level of difficulty in investigating the cause of the occurrence of the memory leak is said high.

In an example of the technique related to the memory dump, a memory space is divided into memory areas and the priority of each memory area is determined, and then the information stored in the memory area is compressed in the order of the determined priority and output into a dump file. In another example of the technique, when there are continuous same codes in data of a memory area, the data is compressed and sampled according to a predetermined rule.

Please see, for example, Japanese Laid-open Patent Publications No. 2009-205254 and No. 05-233383.

When an abnormality in processing, such as the memory leak, has occurred, the power supply of a computer is usually turned off and turned on to dissolve the abnormal state. Before the power supply of the computer is turned off, investigation information that is used for investigation of the cause of the occurrence of the abnormality is collected and recorded on a nonvolatile storage medium inside the computer.

Here, also in performing the collection processing of investigation information, a certain amount of memory area may be needed as a work area. However, when a work area for collection of investigation information is secured in advance inside a memory during normal operation, in which no abnormality has occurred, the available memory capacity decreases by the amount of this work area, which may affect the performance of the computer during normal operation.

SUMMARY

According to one aspect, there is provided an information processing apparatus including: a volatile memory; a nonvolatile memory; and a processor configured to perform a procedure including: upon detection of the occurrence of an abnormality in processing, setting a work area in a storage area except a collection target area of investigation information used for investigation of the cause of the occurrence of the abnormality, in a storage area of the volatile memory; and collecting the investigation information from the volatile memory and storing the same into the nonvolatile memory by using the set work area.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a diagram illustrating an example of the information registered with an investigation information management table;

DESCRIPTION OF EMBODIMENTS

Hereinafter, embodiments will be described with reference to the accompanying drawings.

First Embodiment

Figure 1:
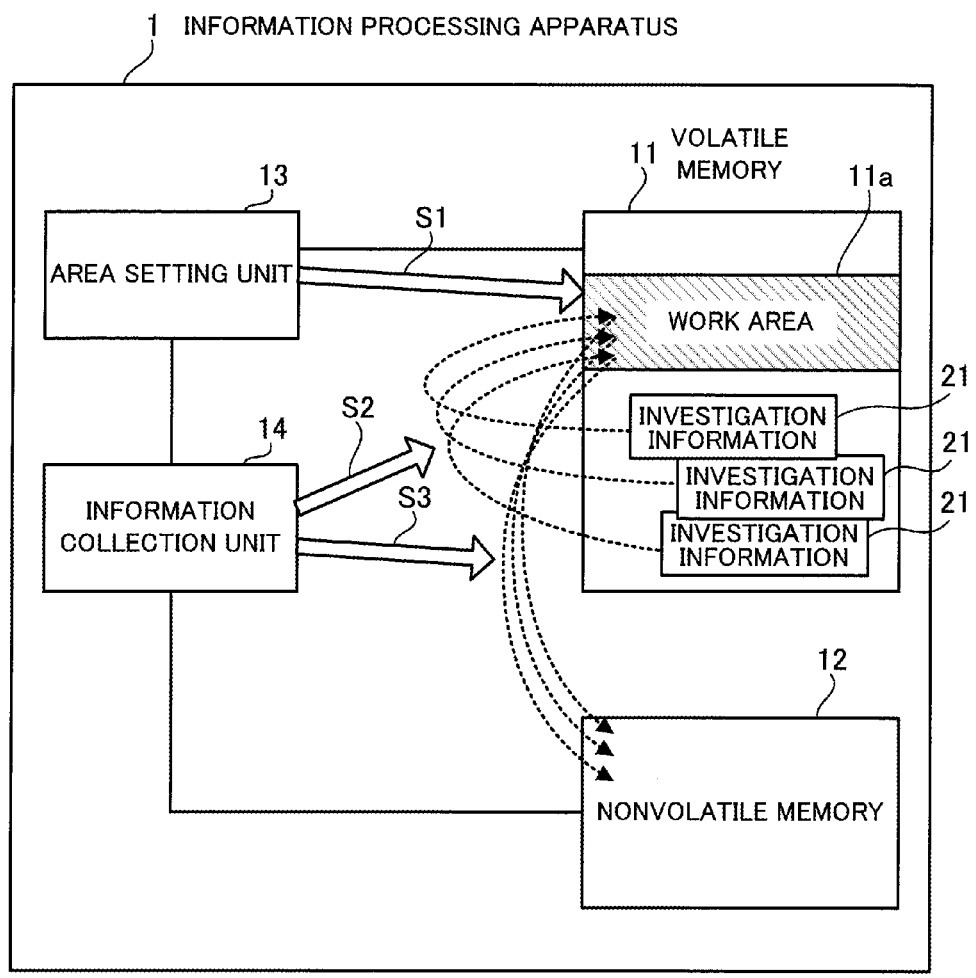
FIG. 1 is a diagram illustrating a configuration example and processing example of an information processing apparatus according to a first embodiment.

FIG. 1 is a diagram illustrating a configuration example and processing example of an information processing apparatus according to a first embodiment. An information processing apparatus 1 includes a volatile memory 11, a nonvolatile memory 12, an area setting unit 13, and an information collection unit 14.

In the volatile memory 11, various types of data are temporarily stored when the information processing apparatus 1 processes. For example, in the nonvolatile memory 12, a part of a program, during processing of the information processing apparatus 1, and the data needed for executing a program are stored. In the nonvolatile memory 12, information to be retained even when the power supply of the information processing apparatus 1 is turned off is stored.

The processing of the area setting unit 13 and the processing of the information collection unit 14 are implemented, for example, by a processor executing a predetermined program, the processor which the information processing apparatus 1 includes. The area setting unit 13 and information collection unit 14 implement the following processing when an abnormality in processing has occurred in the information processing apparatus 1.

Upon detection of the occurrence of an abnormality in processing, the area setting unit 13 sets, in a storage area of the volatile memory 11, a work area 11a, which is used in processing of the information collection unit 14, in a storage area except a collection target area of investigation information 21 (Step S1 in FIG. 1). The investigation information 21 is the information used for investigation of the cause of the occurrence of an abnormality. By controlling not to set the work area 11a in the collection target area of the investigation information 21, the investigation information 21 may be reliably collected to increase the possibility that the cause of the occurrence of an abnormality may be determined.

For example, when the memory leak has occurred as an abnormality in processing, an area in which the memory leak has occurred serves as the collection target area of the investigation information 21. The memory leak is the phenomenon that an available memory capacity is exhausted in a predetermined area on the volatile memory 11. In order to investigate the cause of the occurrence of the memory leak, it is useful to collect the investigation information 21 from an area in which the memory leak has occurred (i.e., from a certain area in which an available memory capacity has been exhausted). Therefore, the area in which the memory leak has occurred is excluded from an area which the work area 11a may be set to.

The examples of the investigation information 21 corresponding to the memory leak may include the management information indicative of a task or a program to which the memory resource of an area, in which the memory leak has occurred, is allocated. Note that, when a part of such management information is stored also in another area different from the area, in which the memory leak has occurred, in the storage area of the volatile memory 11, the another area also serves as the collection target area of the investigation information 21 and is excluded from the area which the work area 11a may be set to. Moreover, the information (memory dump information) on the whole of the area in which the memory leak has occurred may also serve as the investigation information 21.

The information collection unit 14 collects the investigation information 21 from the volatile memory 11, and stores the same into the nonvolatile memory 12. The information collection unit 14 executes such processing using the work area 11a set by the area setting unit 13.

For example, the information collection unit 14 temporarily records the investigation information 21, which is collected from the volatile memory 11, on the work area 11a (Step S2 in FIG. 1), and thereafter reads the investigation information 21 from the work area 11a, and stores the same on the nonvolatile memory 12 (Step S3 in FIG. 1). Alternatively, the information collection unit 14 may edit the investigation information 21, which is collected from the volatile memory 11, using the work area 11a and store the edited investigation information into the nonvolatile memory 12. Alternatively, a part of a program for implementing the processing of the information collection unit 14 may be stored into the work area 11a.

With the above processing, the collected investigation information 21 is stored into the nonvolatile memory 12. Thus, even when the power supply of the information processing apparatus 1 is turned off, the investigation information 21 may be retained. For example, when an abnormality in processing has occurred in the information processing apparatus 1, the abnormal state may be dissolved by turning off and then turning on the power supply of the information processing apparatus 1. In this case, before turning off the power supply of the information processing apparatus 1, the above-described processing by the area setting unit 13 and information collection unit 14 is executed and the collected investigation information 21 is stored into the nonvolatile memory 12. Thus, an administrator may obtain the investigation information 21 from the nonvolatile memory 12 when the power supply of the information processing apparatus 1 is turned on again, and analyze the cause of the occurrence of the abnormality.

Here, in order to collect the investigation information 21 in a manner described above, a work area needs to be secured on the volatile memory 11 for the purposes of temporal storage processing of the collected investigation information 21, the edition processing of the collected investigation information 21, and the like. When such a work area is secured on the volatile memory 11 in advance before an abnormality occurs, the available capacity in the volatile memory 11 may decrease by the amount of such a work area and the performance of the information processing apparatus 1 during normal operation may degrade.

Against such a problem, the work area 11a for collection of the investigation information 21 is secured on the volatile memory 11 by the area setting unit 13 after an abnormality in processing has occurred, so that the investigation information 21 may be collected without degrading the performance of the information processing apparatus 1 during normal operation. Moreover, the work area 11a is set to an area except the collection target area of the investigation information 21 in the storage area of the volatile memory 11, so that the investigation information 21 needed for investigation of the cause of the occurrence of an abnormality may be reliably collected.

Second Embodiment

Next, as an example of an abnormality in processing, memory leak is taken and described. Moreover, a storage system is illustrated as a system including an apparatus corresponding to the information processing apparatus 1 of FIG. 1.

Figure 2:
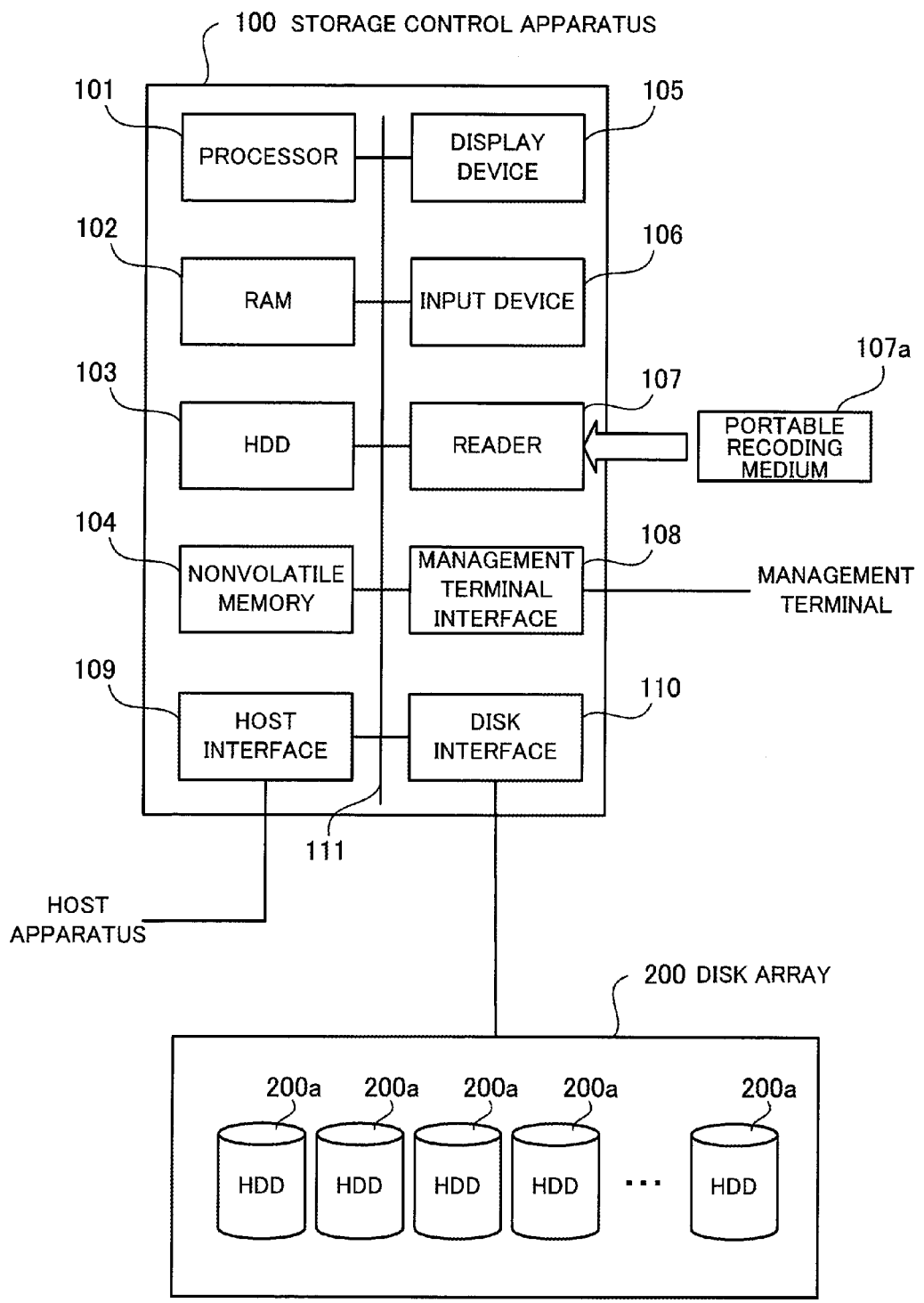
FIG. 2 is a diagram illustrating a configuration example of a storage system according to a second embodiment.

FIG. 2 is a diagram illustrating a configuration example of a storage system according to the second embodiment. The storage system illustrated in FIG. 2 includes a storage control apparatus 100 and a disk array 200.

The disk array 200 includes a plurality of storages each serving as the target of access control from the storage control apparatus 100. In the embodiment, the disk array 200 includes an HDD 200a as the storage serving as the target of access control from the storage control apparatus 100. However, the storage serving as the target of access control from the storage control apparatus 100 may be another type of nonvolatile storage, for example such as an SSD (Solid State Drive). Moreover, a plurality of disk arrays 200 may be connected to the storage control apparatus 100.

The storage control apparatus 100 is one example of the information processing apparatus 1 illustrated in FIG. 1. The storage control apparatus 100 reads and writes data with respect to the HDD 200a inside the disk array 200 in response to a request from a non-illustrated host apparatus. The storage control apparatus 100 has the following hardware configuration, for example.

The whole storage control apparatus 100 is controlled by a processor 101. The processor 101 may be a multiprocessor. The processor 101 is, for example, a CPU (Central Processing Unit), an MPU (Micro Processing Unit), a DSP (Digital Signal Processor), an ASIC (Application Specific Integrated Circuit), or a PLD (Programmable Logic Device). Moreover, the processor 101 may be a combination of two or more of the CPU, MPU, DSP, ASIC, and PLD.

A RAM (Random Access Memory) 102 and a plurality of peripheral devices are connected to the processor 101 via a bus 111.

The RAM 102 is used as a main storage of the storage control apparatus 100. At least a part of an OS (Operating System) program or application program executed by the processor 101 is temporarily stored on the RAM 102. Moreover, various types of data needed for the processing by the processor 101 are stored into the RAM 102.

The peripheral devices connected to the bus 111 include an HDD 103, a nonvolatile memory 104, a display device 105, an input device 106, a reader 107, a management terminal interface 108, a host interface 109, and a disk interface 110.

The HDD 103 is used as an auxiliary storage of the storage control apparatus 100. An OS program, an application program, and various types of data are stored on the HDD 103. Note that, another type of nonvolatile storage, such as an SSD, may be also used as the auxiliary storage.

The nonvolatile memory 104 is realized, for example, by a flash memory, an EEPROM (Electrically Erasable and Programmable Read Only Memory), or the like. For example, information, such as the investigation information for investigating the cause of the occurrence of a failure, which is collected from the inside of the apparatus when the failure has occurred and which is to be retained even when the power supply of the storage control apparatus 100 is turned off, is recorded on the nonvolatile memory 104.

The display device 105 displays an image in accordance with an instruction from the processor 101. The examples of the display device 105 include a liquid crystal display device, an organic EL (ElectroLuminescence) display device, and the like. The input device 106 accepts an operation input by a user, and transmits a signal corresponding to the operation input to the processor 101. The examples of the input device 106 include an operation key, a touch panel, and the like. Note that at least one of the display device 105 and input device 106 may be arranged outside the storage control apparatus 100 and connected to the storage control apparatus 100 by means of a cable or the like.

A portable recording medium 107a is attached to and detached from the reader 107. The reader 107 reads the data recorded on the portable recording medium 107a, and transmits this data to the processor 101. The examples of the portable recording medium 107a include an optical disc, a magneto-optical disc, a semiconductor memory, and the like.

The management terminal interface 108, host interface 109, and disk interface 110 are the communication interfaces for communicating with apparatuses outside the storage control apparatus 100.

The management terminal interface 108 connects to a management terminal operated by an administrator, and transmits and receives data to and from the management terminal. Note that, the administrator may set an operation mode of the storage control apparatus 100, read and analyze the investigation information recorded on the nonvolatile memory 104, and so on using the management terminal.

The host interface 109 connects to the host apparatus via a non-illustrated network, and transmits and receives data to and from the host apparatus. The disk interface 110 connects to the disk array 200, and controls access to the HDD 200a inside the disk array 200 in response to an instruction from the processor 101.

Figure 3:
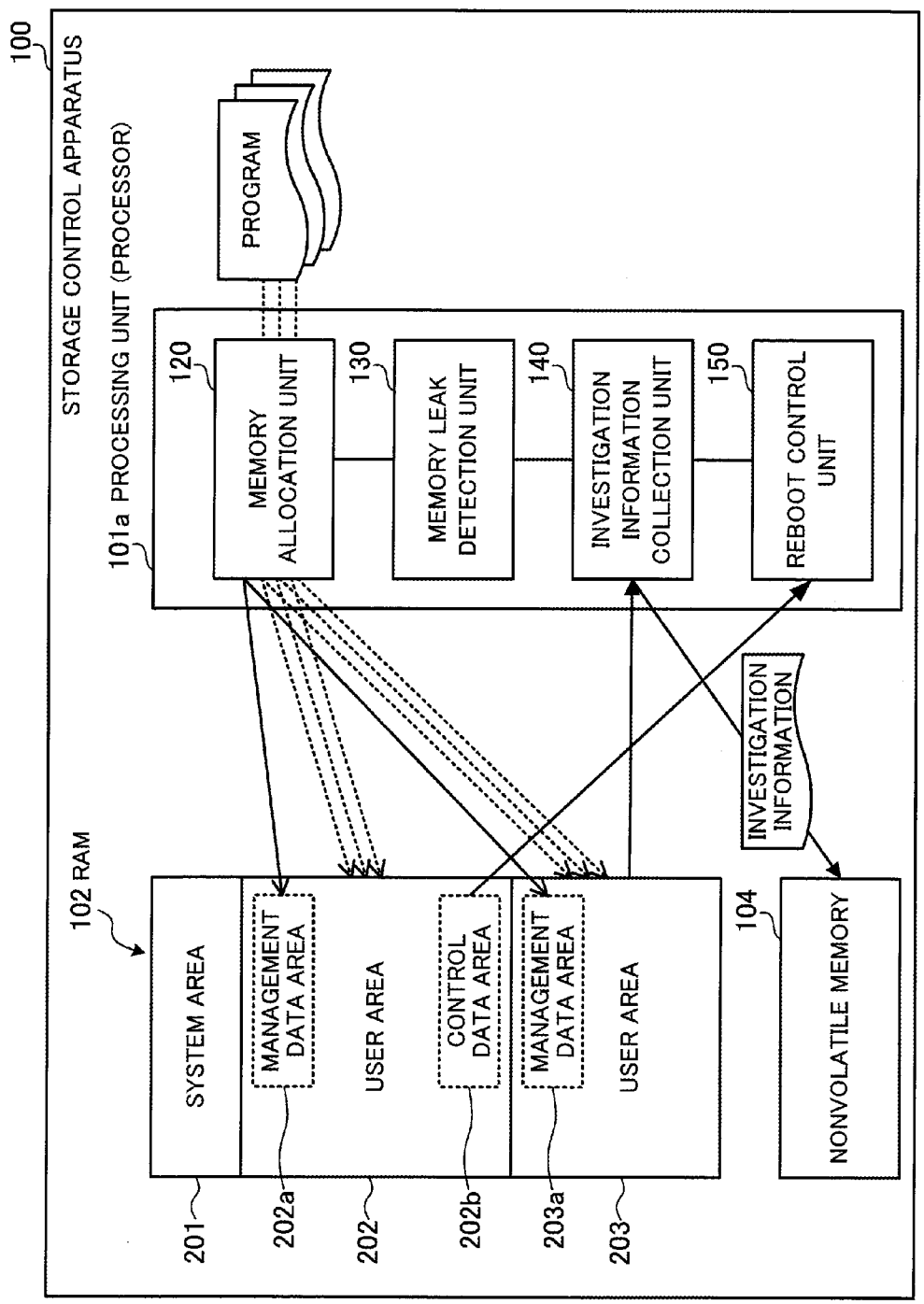
FIG. 3 is a block diagram illustrating a configuration example of a processing function of a storage control apparatus.

FIG. 3 is a block diagram illustrating a configuration example of a processing function of the storage control apparatus. The storage control apparatus 100 includes a processing unit 101a. The processing unit 101a is realized by the processor. Moreover, the processing unit 101a includes a memory allocation unit 120, a memory leak detection unit 130, an investigation information collection unit 140, and a reboot control unit 150.

The processing of the memory allocation unit 120, memory leak detection unit 130, investigation information collection unit 140, and the reboot control unit 150 is implemented, for example, by the processor 101 executing a predetermined program, the processor which the storage control apparatus 100 includes. For example, the processing of the memory allocation unit 120 is implemented by executing an OS program, the processing of the memory leak detection unit 130 is implemented by executing a memory leak detection program, the processing of the investigation information collection unit 140 is implemented by executing an investigation information collection program, and the processing of the reboot control unit 150 is implemented by executing a BIOS (Basic Input/Output System) program. Moreover, the memory leak detection program and the investigation information collection program each may be, for example, a part of the OS program or BIOS program.

The memory allocation unit 120 allocates a storage area of the RAM 102 to a program to be executed, and releases the storage area allocated to the program whose execution is completed. The memory allocation unit 120 divides the storage area of the RAM 102 into a plurality of division areas in accordance with application, and manages each of the division areas as an individual memory resource pool. Then, the memory allocation unit 120 performs the allocation to a program in the unit of a certain size of partial area, from each division area.

In the embodiment, as an example, the storage area of the RAM 102 is divided into three division areas: a system area 201; and user areas 202 and 203.

The program code of a program to be executed is mainly stored in the system area 201. Moreover, a part of control data needed for execution of a program is also stored in the system area 201. Configuration information of a device mounted on or connected to the storage control apparatus 100, control information, such as variables used during execution of a program, and the like are stored in the user area 202. The user area 203 is used as a cache area of data (user data) to be input and output by executing a program, or the like.

The memory allocation unit 120, for example, secures management data areas 202a and 203a for the user areas 202 and 203, respectively, and stores management information for managing the allocation of a corresponding partial area in each of the management data areas 202a and 203a. Then, for example, upon receipt of an allocation request of a partial area of the user area 202, the memory allocation unit 120 selects the partial area from an unallocated area of the user area 202, and allocates the selected partial area to a program to be executed. In this case, the memory allocation unit 120 writes management information indicative of the correspondence between a partial area and a program to which the partial area is allocated and the like into the management data area 202a. Similarly, for the user area 203, the memory allocation unit 120 writes management information indicative of the correspondence between a partial area of the user area 203 and a program, to which the partial area is allocated, and the like into the management data area 203a.

Note that, a part of these pieces of management information may be stored in the system area 201, for example.

Upon completion of execution of the corresponding program, the partial area allocated by the memory allocation unit 120 is usually released and returns to an unallocated area. However, the allocated partial area might not be released due to a certain abnormality, such as a bug contained in the program. Then, when the situation repeatedly occurs where the partial area is not released because the same program is repeatedly executed or for another reason, the capacity of an unallocated area in a division area may be exhausted and an allocation failure may occur with respect to an allocation request for a new partial area. In this case, it is impossible to normally continue the operation of the storage control apparatus 100.

Upon detection of the fact that the memory allocation unit 120 has failed to allocate a partial area, the memory leak detection unit 130 determines that the memory leak has occurred in a division area which the partial area belongs to. The memory leak detection unit 130 provides the information indicative of the division area, in which the memory leak has occurred, to the investigation information collection unit 140.

The investigation information collection unit 140 collects the investigation information used for investigating the cause of the occurrence of the memory leak, from the division area, in which the memory leak has occurred, and stores this information into the nonvolatile memory 104. As described later, the investigation information collection unit 140 sets a work area in a division area except the division area, in which the memory leak has occurred, and executes the collection processing of the investigation information and the storing processing of the investigation information into the nonvolatile memory 104 by using the set work area. Note that, the detail of the processing of the investigation information collection unit 140 is described later.

After the collection processing of investigation information and the storing processing of the investigation information into the nonvolatile memory 104 are completed, the reboot control unit 150 turns off and then turns on the power supply of the storage control apparatus 100. Thus, the occurrence state of the memory leak is dissolved.

Here, a control data area 202b is secured on the user area 202. The configuration information of a device mounted on or connected to the storage control apparatus 100 and the status information of the device are stored in the control data area 202b. The reboot control unit 150 writes the configuration information and status information, which are stored in the control data area 202b, into the nonvolatile memory 104 before turning off the power supply of the storage control apparatus 100. Then, the reboot control unit 150 reads the configuration information and status information stored on the nonvolatile memory 104, when the power supply is turned on to restart the storage control apparatus 100. The reboot control unit 150 may normally start the storage control apparatus 100 by performing the start processing needed for each device described in the configuration information.

In the above-described storage control apparatus 100, before the storage control apparatus 100 is restarted by the reboot control unit 150, the investigation information used for investigation of the cause of the occurrence of the memory leak is collected by the investigation information collection unit 140 and stored onto the nonvolatile memory 104. Thus, also after the storage control apparatus 100 is restarted, the investigation information collected prior to restart is retained in the nonvolatile memory 104. Accordingly, after the storage control apparatus 100 is restarted, the administrator of the storage control apparatus 100 may obtain the investigation information stored on the nonvolatile memory 104 and analyze the cause of the occurrence of the memory leak.

In order for the investigation information collection unit 140 to execute the procedure including collecting investigation information and storing the same into the nonvolatile memory 104, a work area for the execution needs to be secured in a storage area of the RAM 102. However, as described above, the procedure of the investigation information collection unit 140 is executed only after the memory leak occurs, and is not executed during normal operation before the memory leak occurs. Therefore, when all the work areas needed for the procedure of the investigation information collection unit 140 are secured in advance on the RAM 102 during normal operation, the available capacity in the RAM 102 may decrease by the amount of such a work area and the performance of the storage control apparatus 100 during normal operation may degrade.

Moreover, a computer, such as the storage control apparatus 100, usually stores, as log information, the processing result by a program and the like as needed. Then, upon occurrence of an abnormality in processing, the computer collects the stored log information before the power supply is turned off, and stores the same into the nonvolatile memory as trace log information that is used for investigation of the cause of occurrence of the abnormality.

However, the level of difficulty in investigating the cause of the occurrence of the memory leak is usually high, and it is thus difficult to identify the cause of occurrence from the trace log information. Therefore, collection processing of investigation information dedicated for the investigation of the memory leak is executed separately from the collection processing of trace log information. This means that on the RAM 102, separately from a work area for collection of trace log information, a work area for collection of the investigation information for the memory leak is needed. Accordingly, when all the work areas for collecting the memory leak investigation information are secured in advance on the RAM 102, the available capacity on the RAM 102 will be further reduced.

Then, the storage control apparatus 100 of the embodiment causes, after the memory leak has occurred, the investigation information collection unit 140 to secure a part of the work area for collecting the memory leak investigation information instead of securing the same in advance on the RAM 102. At this time, the investigation information collection unit 140 secures the work area in an area except the collection target area of investigation information, specifically except a division area, in which the memory leak has occurred. Thus, the data of a division area in which the memory leak has occurred, may be secured, and from the secured data, information useful for identifying the cause of the occurrence of the memory leak may be reliably collected.

Figure 4:
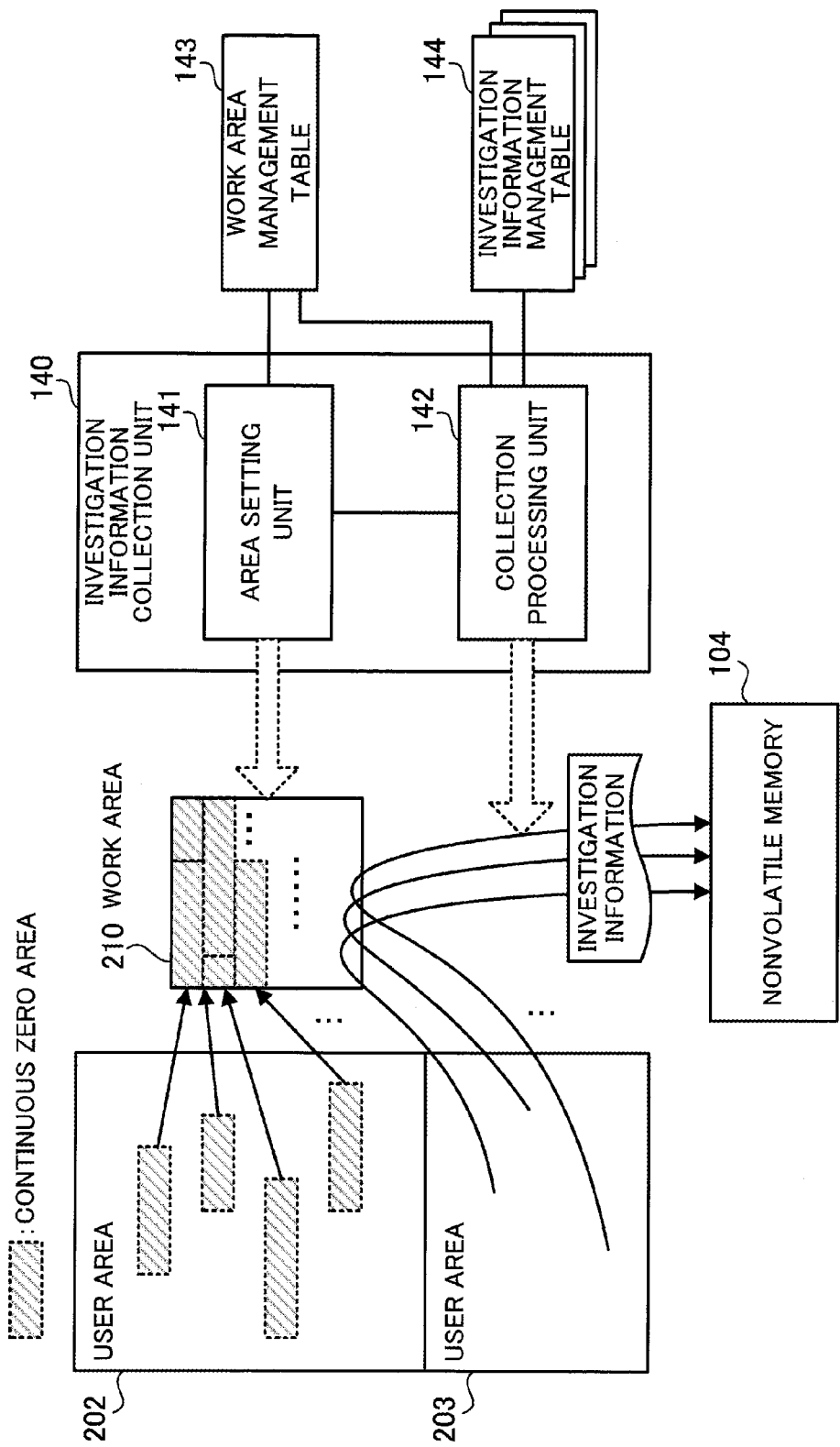
FIG. 4 is a diagram for illustrating the processing of an investigation information collection unit.

FIG. 4 is a diagram for illustrating the processing of the investigation information collection unit. As illustrated in FIG. 4, the investigation information collection unit 140 includes an area setting unit 141 and a collection processing unit 142.

The area setting unit 141 secures a work area in an area except the collection target area of investigation information in the storage area of the RAM 102. The area setting unit 141 registers the information related to the secured work area with a work area management table 143 and manages the same.

The collection processing unit 142 collects investigation information from the RAM 102 using the work area secured by the area setting unit 141, and stores the collected investigation information into the nonvolatile memory 104. The collection processing unit 142 determines the investigation information to be collected, with reference to management information of the investigation information management table 144 in performing a procedure including collecting and storing such investigation information. As described later, the investigation information management table 144 is prepared in advance for each division area on the RAM 102.

Here, the area setting unit 141 searches for a plurality of "continuous zero areas", in which a predetermined number of values "0" continue, from a storage area except the collection target area of investigation information in the storage area of the RAM 102. Then, the area setting unit 141 sets, as the work area, a storage area obtained by logically combining a plurality of found continuous zero areas. Each of the continuous zero areas will return to the original state by being written back to the value "0" after being used in the procedure including collecting and storing investigation information. Therefore, before and after being set as the work area, the data originally recorded on the area may be secured.

Hereinafter, a case where the memory leak has occurred in the user area 203 is taken as an example and described. When the memory leak has occurred in the user area 203, at least the user area 203 serves the collection target area of investigation information. For example, investigation information is collected from the management information related to the allocation of a partial area stored in the management data area 203a of the user area 203. Note that the management data area 203a may be distributed and secured on a plurality of areas in the user area 203. Moreover, the memory dump information indicative of the storage content of the whole user area 203 may be collected as the investigation information.

On the other hand, the user area 202 will not be the collection target area of investigation information. Accordingly, the area setting unit 141 searches for a continuous zero area from the user area 202 which is not the collection target area of investigation information.

Note that, because at least a part of a program for implementing the processing of the investigation information collection unit 140 is stored in the system area 201, the storage content of the system area 201 needs to be secured. Therefore, the system area 201 is excluded from the area to be searched for the continuous zero area. Moreover, a part of the management information related to the allocation of a partial area from the user area 203 may be stored in advance in the system area 201. In this case, because the system area 201 also serves as the collection target area of investigation information, the system area 201 is excluded from the area to be searched for a continuous zero area.

The area setting unit 141 logically combines a plurality of continuous zero areas that are found from the user area 202, and sets the combined area as a work area 210. The collection processing unit 142 temporarily stores the investigation information, which is collected from the user area 203, into the set work area 210, and subsequently reads this investigation information from the work area 210 and stores the same into the nonvolatile memory 104. Moreover, when the above-described management information is already stored in the system area 201, the investigation information may be collected from the system area 201.

Note that, the collection processing unit 142 may perform edition processing with respect to the collected investigation information, and may store the edited information into the nonvolatile memory 104. In this case, the work area 210 may be used for edition processing.

Once all the needed investigation information are collected by the collection processing unit 142 and stored onto the nonvolatile memory 104, the area setting unit 141 writes the value "0" into all the continuous zero areas that are found from the user area 202. Thus, the storage content of the user area 202 returns to a state before the state where the work area 210 is secured and used.

As described above, the information recorded on the control data area 202b of the user area 202 is referred to by the reboot control unit 150 when the power supply of the storage control apparatus 100 is turned off. The continuous zero area in the user area 202 is used as the work area 210, and thereafter the value "0" is written back to the continuous zero area, so that the information recorded on the control data area 202b will not be lost. Therefore, the storage control apparatus 100 may be normally restarted.

Note that, as described above, the reboot control unit 150 writes the information, which is recorded on the control data area 202b, into the nonvolatile memory 104 after the processing of the investigation information collection unit 140 is completed. By employing such a process sequence, the existing BIOS program for implementing the processing of the reboot control unit 150 may be used as it is without any change.

Moreover, in the above-described example, a work area is secured by logically combining areas in which a predetermined number of values "0" continue, but as another example, a work area may be secured by logically combining areas in which a predetermined number of values "1" continue. However, in an area in which a certain number of values "0" continuously appear, the possibility that effective data has not been written yet is high. Therefore, an area in which a predetermined number of values "0" continue is searched for, so that for example even when an abnormality occurs in the processing of the investigation information collection unit 140 and thus the work area is not restored to the original state, the possibility that original data is destroyed may be reduced.

Figure 5:
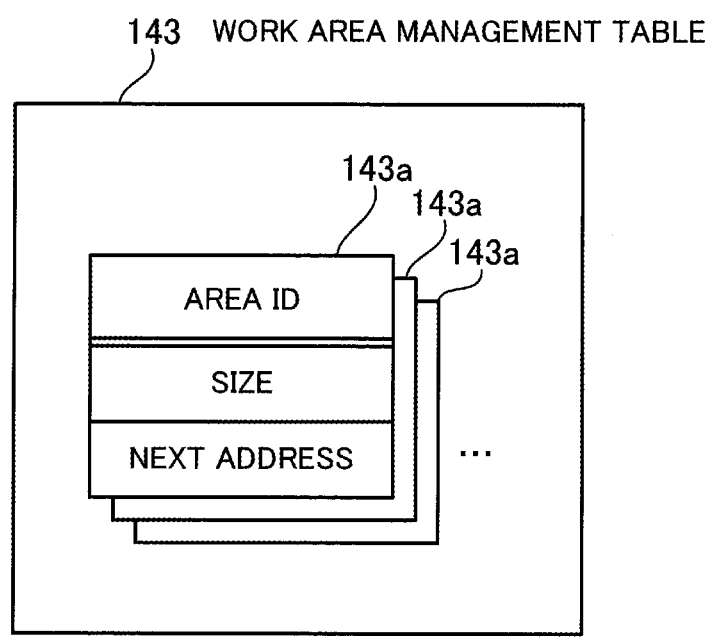
FIG. 5 is a diagram illustrating an example of the information registered with a work area management table.

FIG. 5 is a diagram illustrating an example of the information registered with the work area management table. The work area management table 143 is temporarily recorded on the system area 201 of the RAM 102, for example.

The work area management table 143 is table information for managing the information related to a work area secured by the area setting unit 141. The same number of records 143a as the number of continuous zero areas found by the area setting unit 141 are registered with the work area management table 143.

Each record 143a has the respective items of area ID, size, and next address. With the item of area ID, an identification number for identifying the corresponding continuous zero area is registered. With the item of size, the size of the corresponding continuous zero area is registered. With the item of next address, a start address in the RAM 102 of a continuous zero area corresponding to the next record 143a is registered.

Here, with the item of next address of the rearmost record 143a in the work area management table 143, the start address of a continuous zero area corresponding to the leading record 143a in the work area management table 143 is registered. Thus, positional information on all the found continuous zero areas are managed.

Next, the collection processing of investigation information by the collection processing unit 142 based on the investigation information management table 144 is described. The investigation information management table 144 is, for example, stored on the HDD 103 in advance, and read to the RAM 102 from the HDD 103 and referred to. Moreover, the investigation information management table 144 is prepared for each division area of the RAM 102. Then, with each investigation information management table 144, the information related to the investigation information to be collected is already registered for the corresponding division area.

FIG. 6 is a diagram illustrating an example of the information registered with the investigation information management table. With the investigation information management table 144, a resource ID for identifying the corresponding division area is already registered. Moreover, with the investigation information management table 144, collection instruction information 144*a* and investigation information list 144*b* are already registered.

With the investigation information list 144*b*, a list of investigation information IDs indicative of the investigation information to be collected is registered. Moreover, with each investigation information ID, the size of investigation information is associated and registered.

The order of registration of investigation information in the investigation information list 144*b* is set in the descending order of priority of collection. The investigation information is collected in the descending order of priority by the collection processing unit 142. With regard to the priority, the investigation information is important for the purpose of investigation of the cause of the occurrence of the memory leak, and the smaller the size of investigation information, the higher the priority is set. Here, the size of investigation information indicates how much time it takes to perform the procedure including collecting and storing the investigation information.

The examples of the investigation information include the following ones. The highest priority investigation information includes information on the memory size allocated to a division area for each layer of a program, such as an OS, a driver, and an application. For example, when there is a layer using a large amount of memory area of the user area in which the memory leak has occurred, an event causing the memory leak may have occurred in the layer. Therefore, the importance of the allocation size for each layer is high and the priority thereof is also set high.

Moreover, the next highest priority investigation information includes information on the memory size allocated to a division area for each task. For example, when the same task is using a plurality of partial areas in the user area, an event causing the memory leak may have occurred in the task. Therefore, while the importance of the allocation size for each task is high, the data size increases as compared with the allocation size for each layer. Therefore, the priority of the allocation size for each task is set lower than the allocation size for each layer.

Moreover, the next highest priority investigation information includes information on the memory size allocated to a division area for each program. The program herein refers to, for example, each of a plurality of programs included in an application program. For example, the program herein refers to a program described as one execution file. Here, when the same program is using a plurality of partial areas of the user area, the program may have a bug causing the memory leak. Therefore, while the importance of the allocation size for each program is high, the data size increases as compared with the allocation size for each task. Therefore, the priority of the allocation size for each program is set lower than the allocation size for each task.

Note that, for the above-described three pieces of investigation information, for example, the user area 202 may be collected from the management data area 202*a* and the user area 203 may be collected from the management data area 203*a*, respectively.

On the other hand, the lowest priority investigation information includes memory dump information indicative of the memory content of the whole corresponding division area. Since the size of the memory dump information is huge, the lowest priority is set to the memory dump information.

With the collection instruction information 144*a*, information indicating to which priority level investigation information need to be collected is registered in accordance with an operation mode at the time point of the occurrence of the memory leak. A plurality of sets of the items of operation mode and priority lower limit are registered with the collection instruction information 144*a*.

In the embodiment, the operation modes of the storage control apparatus 100 include a normal operation mode and a debug mode. The normal operation mode is an operation mode set to the normal state where works are performed using the storage control apparatus 100. The debug mode is a mode in which the storage control apparatus 100 operates for the purpose of debugging, and is set after working hours.

In this case, in the collection instruction information 144*a*, a priority lower limit is associated with each of the normal operation mode and the debug mode. With the item of priority lower limit, a value of priority indicating to which priority level investigation information from the highest priority investigation information need to be collected is registered.

In the example of FIG. 6, when the operation mode is the normal operation mode, pieces of investigation information from priority 1 to priority 4 are collected. On the other hand, when the operation mode is the debug mode, pieces of investigation information from priority 1 to priority 7 are collected.

Here, with the investigation information management table 144, information is registered so that more pieces of investigation information are collected in the debug mode than in the case of the normal operation mode. This is due to the following reason. In the case of the normal operation mode, the storage control apparatus 100 needs to be restarted to resume works in a short time. Therefore, the reduction of the size of investigation information to be collected is prioritized over the collection of more pieces of investigation information. On the other hand, in the case of the debug mode, the identification of the cause of the memory leak is prioritized over the restart of the storage control apparatus 100 in a short time, so that more pieces of investigation information are collected than in the case of the normal operation mode.

Figure 7:
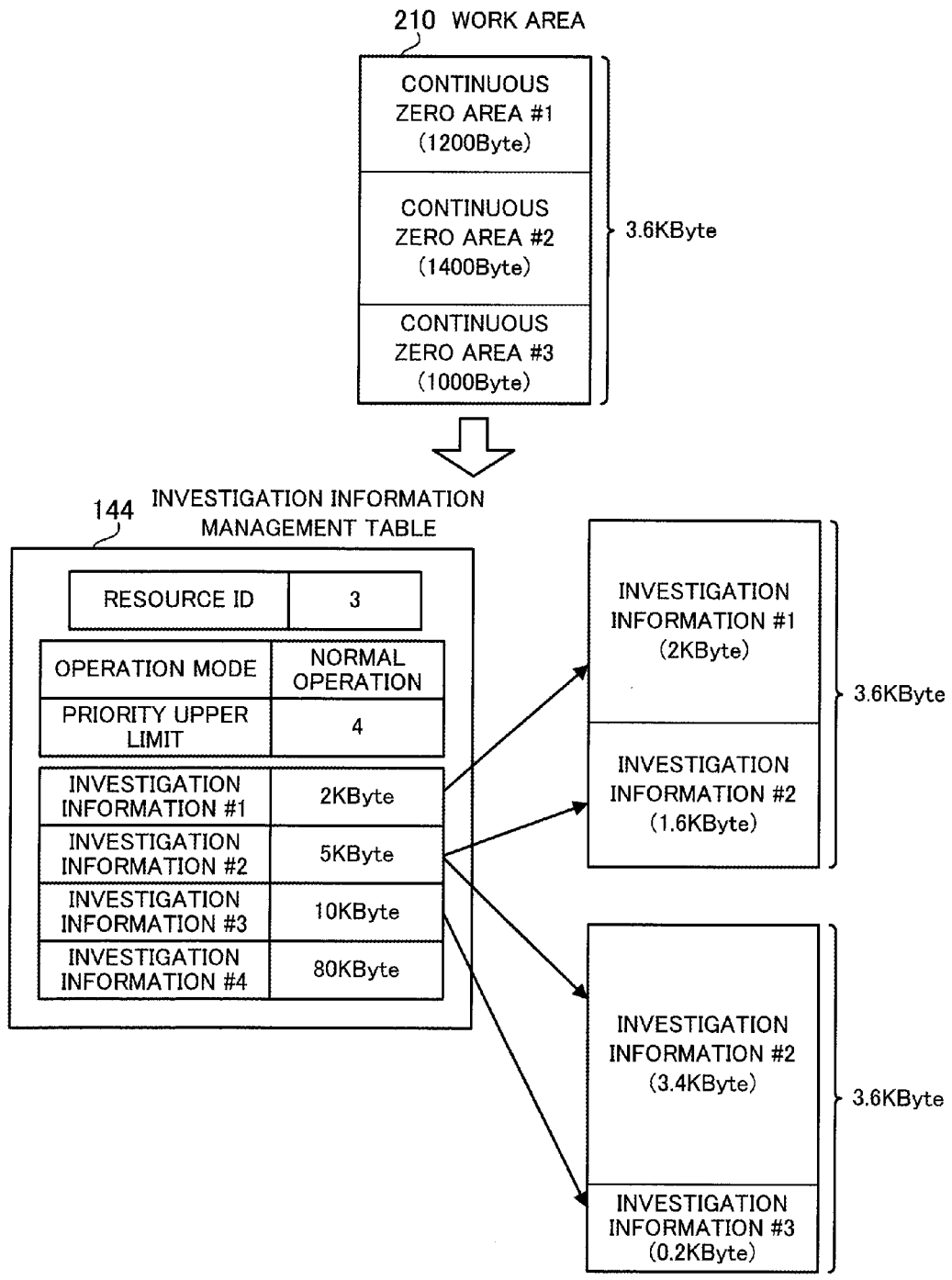
FIG. 7 is a diagram for illustrating a procedure of collecting and storing investigation information corresponding to the size of a secured work area.

Next, FIG. 7 is a diagram for illustrating a procedure including collecting and storing investigation information corresponding to the size of a secured work area.

The size of a work area secured by the area setting unit 141 will not be constant. Therefore, a total size (capacity) of investigation information to be collected may be larger than the size of a secured work area. In this case, the collection processing unit 142 performs the collection of investigation information for each size of the secured work area.

In the example of FIG. 7, assume that three continuous zero areas #1, #2, and #3 have been found by the area setting unit 141 and combined to secure a work area 210 of 3.6K bytes. On the other hand, assume that based on the investigation information management table 144 corresponding to a division area, in which the memory leak has occurred, investigation information #1 of 2K bytes, investigation information #2 of 5K bytes, investigation information #3 of 10K bytes, and investigation information #4 of 80K bytes have been identified as the investigation information to be collected. In this case, a total size of the investigation information to be collected is 97K bytes.

Assume that while the collection processing unit 142 collects, from the RAM 102, investigation information in the descending order of priority, the write size into the work area 210 per one collection is 3.6K bytes. Specifically, the collection processing unit 142 collects the investigation information #1 and 1.6 k bytes of information of the investigation information #2 and writes these pieces of information into the work area 210 first, and then stores the same into the nonvolatile memory 104. Next, the collection processing unit 142 collects the remaining 3.4K bytes of information of the investigation information #2 and 0.2K bytes of information of the investigation information #3, and writes these pieces of information into the work area 210 and then stores the same into the nonvolatile memory 104.

With such a procedure, even when the size of a secured work area is smaller than a total size of the investigation information to be collected, needed investigation information may be reliably collected and stored onto the nonvolatile memory 104.

Figure 8:
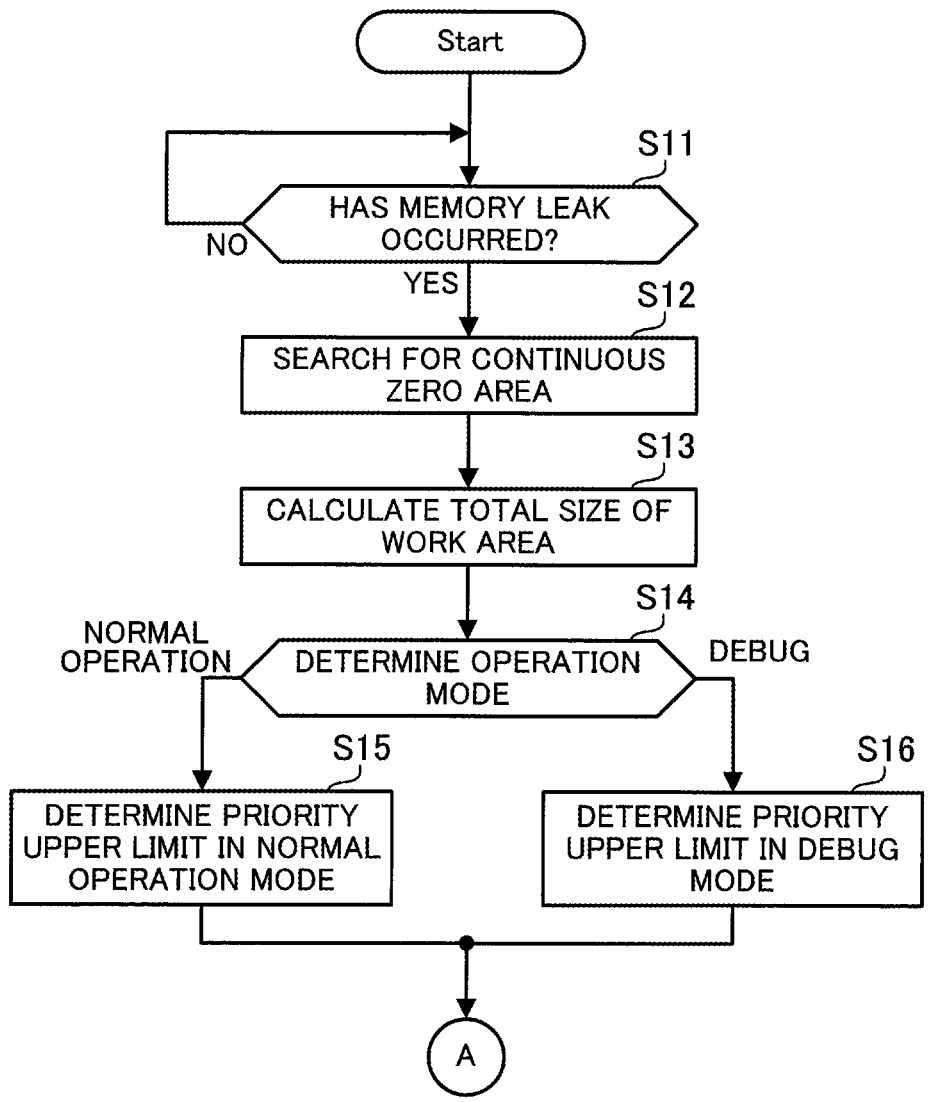
FIG. 8 is a flow chart (Part 1) illustrating an example of a procedure of the storage control apparatus.
Figure 9:
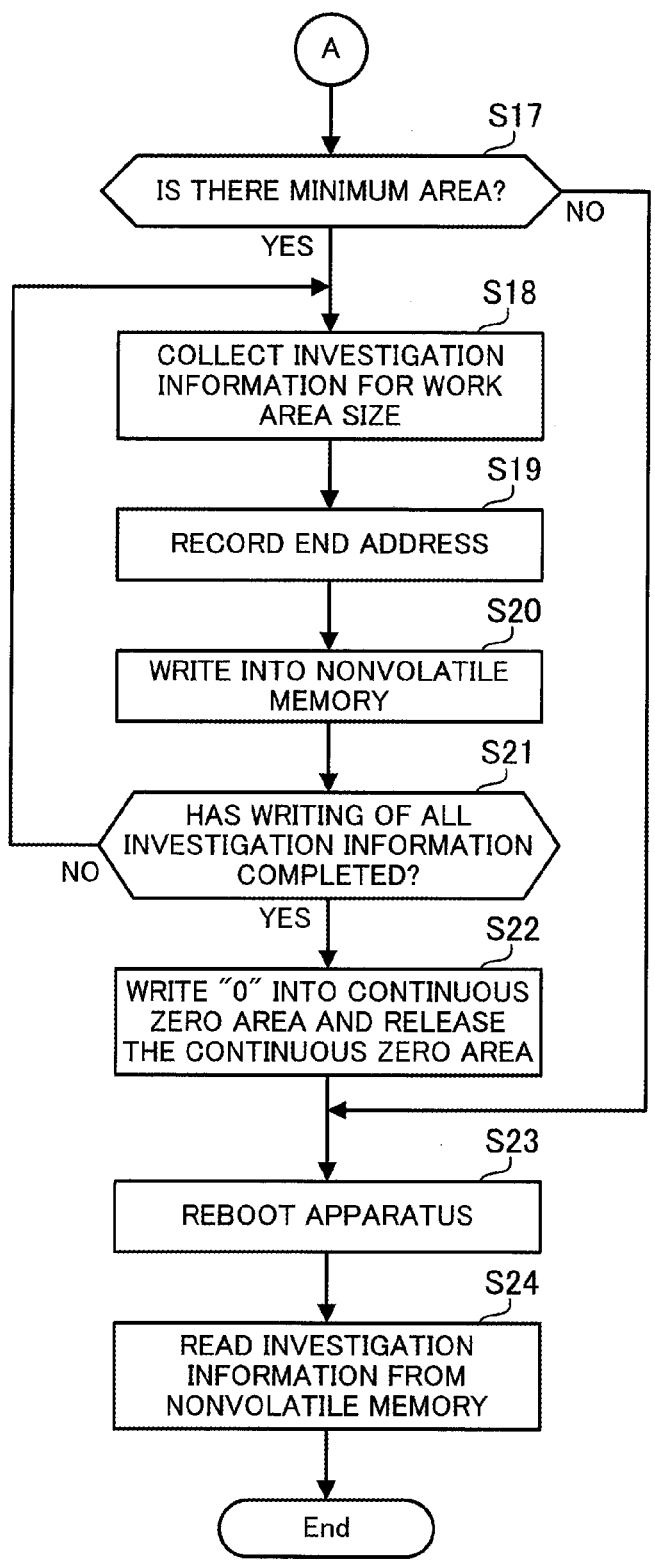
FIG. 9 is a flow chart (Part 2) illustrating the example of the procedure of the storage control apparatus.

Next, the processing of the storage control apparatus 100 is described using a flow chart. FIG. 8 and FIG. 9 are flow charts illustrating an example of a procedure of the storage control apparatus.

[Step S11] The memory leak detection unit 130 monitors whether or not the memory allocation unit 120 fails to allocate a partial area to a program. When the memory allocation unit 120 fails in allocation, the memory leak detection unit 130 determines that the memory leak has occurred. Then, the memory leak detection unit 130 notifies the investigation information collection unit 140 of a division area in which the memory leak has occurred. Thereafter, the process of Step S12 is executed.

[Step S12] The area setting unit 141 of the investigation information collection unit 140 determines a division area to be searched for a continuous zero area, in accordance with the division area, in which the memory leak has occurred and which is notified from the memory leak detection unit 130. As described above, the area to be searched for a continuous zero area is at least a division area except the division area, in which the memory leak has occurred. Moreover, the system area 201 is also excluded from the area to be searched for a continuous zero area.

The area setting unit 141 searches for a continuous zero area, in which a predetermined number of values "0" continue, from the division area determined as the area to be searched. The area setting unit 141 determines, as the continuous zero area, an area in which no less than 100 bytes of values "0" continue for example. The area setting unit 141 registers the information related to the found continuous zero area with the work area management table 143.

[Step S13] The collection processing unit 142 calculates a total size of all the found continuous zero areas, i.e., the size of the secured work areas, with reference to the work area management table 143.

[Step S14] The collection processing unit 142 determines the current operation mode of the storage control apparatus 100. When the operation mode is the normal operation mode, the process of Step S15 is executed, while when the operation mode is the debug mode, the process of Step S16 is executed.

[Step S15] The collection processing unit 142 determines the priority upper limit in the normal operation mode with reference to the investigation information management table 144 corresponding to a division area, in which the memory leak has occurred. As described above, the priority upper limit indicates to which priority level investigation information from the highest priority investigation information need to be collected.

[Step S16] The collection processing unit 142 determines the priority upper limit in the debug mode with reference to the investigation information management table 144 corresponding to a division area, in which the memory leak has occurred.

[Step S17] The collection processing unit 142 determines whether or not the minimum area has been secured as a work area that is obtained by combining the found continuous zero areas. Specifically, when the size of the work area calculated in Step S13 is equal to or greater than a predetermined threshold value, the collection processing unit 142 determines that the minimum area has been secured. When it is determined that the minimum area has been secured, the process of Step S18 is executed, while when it is determined that the minimum area has not been secured, the process of Step S23 is executed.

In this Step S17, when the size of the secured work area is less than the threshold value, an investigation information collection efficiency is determined as poor because the work area is too small, and the power supply of the storage control apparatus 100 is turned off and turned on without collecting investigation information. As the threshold value, for example, among the sizes of the investigation information registered with the investigation information management table 144 corresponding to a division area, in which the memory leak has occurred, the size of the highest priority investigation information is used.

In the next Steps S18 to S21, the investigation information registered with the investigation information management table 144 corresponding to a division area, in which the memory leak has occurred, is collected in the descending order of priority. Moreover, to which priority level investigation information from the highest priority investigation information need to be collected among the registered pieces of investigation information is determined based on the determination result of Step S15 or Step S16.

Note that, in Steps S18 to S21, an "end address" is used as a variable. The initial value of the variable "end address" is "NULL". Moreover, the variable "end address" is recorded, for example, in the system area 201 of the RAM 102.

[Step S18] The collection processing unit 142 collects, from the RAM 102, investigation information for the size of the work area calculated in Step S13, and writes the same into the work area. When a value is registered in the variable "end address" (i.e., when it is not "NULL"), a read start position from the RAM 102 is the next position of the position of the value registered in the variable "end address". Note that the collection processing unit 142 recognizes the work area of a write destination with reference to the work area management table 143.

[Step S19] The collection processing unit 142 updates the variable "end address" using the address of the final position of the area that is read from the RAM 102 in Step S18.

[Step S20] The collection processing unit 142 writes the investigation information, which is written into the work area in Step S18, into the nonvolatile memory 104.

[Step S21] The collection processing unit 142 determines whether or not writing of all the investigation information to be collected into the nonvolatile memory 104 is completed. When the writing is not completed yet, the process of Step S18 is executed, while when the writing is completed, the process of Step S22 is executed.

[Step S22] The area setting unit 141 writes the value "0" into all the continuous zero areas that are found in Step S12. Thus, the continuous zero area is released from the state where it is set to the work area, and the division area which this continuous zero area belongs to returns to the original state.

[Step S23] The reboot control unit 150 turns off and then turns on the power supply of the storage control apparatus 100. Note that, as described above, the reboot control unit 150 writes the configuration information and status information, which are stored in the control data area 202b inside the user area 202, into the nonvolatile memory 104, and then turns off the power supply of the storage control apparatus 100. Then, the reboot control unit 150 turns on the power supply of the storage control apparatus 100 again, and then during start processing of the storage control apparatus 100, the reboot control unit 150 refers to the configuration information and status information that are written in the nonvolatile memory 104.

[Step S24] The investigation information written into the nonvolatile memory 104 is read by the operation of an administrator or the like. The read investigation information is used for the analysis of the cause of the occurrence of the memory leak or the like.

In the storage control apparatus 100 described above, when the memory leak has occurred, the investigation information for investigation of the cause of the occurrence of the memory leak is collected and stored onto the nonvolatile memory 104 before turning off the power supply of the apparatus. Therefore, the investigation information may be reliably sampled and used for analysis of the cause of the occurrence of the memory leak.

Moreover, the storage control apparatus 100 sets, after the memory leak has occurred, a part of the work area for the procedure including collecting and storing such investigation information into an area except the collection target area of investigation information in the storage area of the RAM 102. Then, the storage control apparatus 100 performs the procedure including collecting and storing the investigation information, using the set work area. Thus, the available capacity of the RAM 102 during normal operation in which the memory leak has not occurred may be increased, and the performance of the apparatus during normal operation may be improved. Moreover, the work area is set to an area except the collection target area of investigation information, so that the needed investigation information may be reliably collected. That is, needed investigation information may be reliably collected without affecting the performance of the apparatus during normal operation.

Moreover, the work area is set to an area obtained by logically combining the continuous zero areas. Thus, the division area in which the work area is set may be restored after the procedure including collecting and storing the investigation information is completed. Therefore, for example even when a work area is set in a division area, in which the information needed to reboot the storage control apparatus 100 is stored, the division area may be restored and the reboot may be executed normally.

Note that, the processing functions of the apparatuses (information processing apparatus 1, storage control apparatus 100) illustrated in the above-described each embodiment may be realized by a computer. In this case, a program describing the processing content of a function which each apparatus needs to have is provided and the program is executed by a computer, so that the above-described processing functions may be realized on the computer. The program describing the processing content may be recorded on a computer-readable recording medium. The examples of the computer-readable recording medium include a magnetic storage, an optical disc, a magneto-optical recording medium, and a semiconductor memory. The examples of the magnetic storage include a hard disk drive unit (HDD), a flexible disk (FD), and a magnetic tape. The examples of the optical disc include a DVD (Digital Versatile Disc), a DVD-RAM, a CD-ROM (Compact Disc-Read Only Memory), and a CD-R (Recordable)/RW (Rewritable). The examples of the magneto-optical recording medium include an MO (Magneto-Optical disk).

When a program is distributed, portable recording media, such as a DVD and a CD-ROM, on which the program is recorded, are sold, for example. Moreover, a program may be stored in advance on a storage of a server computer, and the program may be transferred to another computer from the server computer via a network.

A computer which executes a program stores, into a storage of the computer, a program recorded on a portable recording medium or a program transferred from a server computer, for example. Then, the computer reads the program from the storage of the computer, and executes the processing in accordance with the program. Note that the computer may read the program directly from the portable recording medium and execute the processing in accordance with the program. Moreover, every time a program is transferred from a server computer connected thereto via a network, the computer may successively execute the processing in accordance with the received program.

According to one aspect, the information for investigation of the cause of the occurrence of an abnormality may be collected without affecting the performances of the apparatus.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An information processing apparatus comprising:
   a volatile memory;
   a nonvolatile memory; and
   a processor configured to perform a procedure including:
   setting, upon detection of an occurrence of a memory leak, a work area in a storage area of the volatile memory, the work area being different from an area in which the memory leak has occurred; and
   collecting investigation information from the area in which the memory leak has occurred and storing the investigation information into the nonvolatile memory by using the set work area, the investigation information being used for investigation of a cause of the occurrence of the memory leak.

2. The information processing apparatus according to claim 1, wherein
   the setting the work area includes searching for a continuous area, in which a predetermined number or more of predetermined values are sequentially stored, from the storage area other than the area in which the memory leak has occurred, and setting the continuous area as the work area, and wherein the procedure further includes writing back the predetermined values to a whole of the continuous area, upon completion of storing the investigation information into the nonvolatile memory.

3. The information processing apparatus according to claim 2, wherein the procedure further includes:
after the predetermined values are written back to the whole of the continuous area, reading out information used for a boot process of the information processing apparatus, from the storage area other than the area in which the memory leak has occurred;
storing the information in the nonvolatile memory;
turning off and then turning on a power supply of the information processing apparatus; and
performing the boot process by using the information.

4. The information processing apparatus according to claim 2, wherein
the setting the work area includes setting, when the continuous area is found in plurality, a storage area obtained by combining the plurality of continuous areas, as the work area.

5. The information processing apparatus according to claim 4, wherein
the collecting the investigation information includes collecting the investigation information to be collected, from the volatile memory, for each data capacity of the storage area obtained by combining the plurality of continuous areas, temporarily storing the investigation information into the work area, and storing data stored in the work area, into the nonvolatile memory.

6. The information processing apparatus according to claim 1, wherein
the investigation information is provided in plurality, wherein
a priority is given in advance to each of the plurality of pieces of investigation information collected from the volatile memory, wherein
information indicating up to which priority level investigation information needs to be collected is registered in management information in advance, for each operation mode of the information processing apparatus, and wherein
the collecting the investigation information includes determining the investigation information to be collected from the volatile memory, based on an operation mode of the information processing apparatus and the management information at a time point when the memory leak has occurred.

7. An information collection method comprising:
when a computer including a volatile memory and a nonvolatile memory detects an occurrence of a memory leak,
setting, by the computer, a work area in a storage area of the volatile memory, the work area being different from an area in which the memory leak has occurred; and
collecting, by the computer, investigation information from the area in which the memory leak has occurred and storing the investigation information into the nonvolatile memory by using the set work area, the investigation information being used for investigation of a cause of the occurrence of the memory leak.

8. The information collection method according to claim 7, wherein
the setting the work area includes searching for a continuous area, in which a predetermined number or more of predetermined values are sequentially stored, from the storage area other than the area in which the memory leak has occurred, and setting the continuous area as the work area, and
upon completion of storing the investigation information into the nonvolatile memory, writing back the predetermined values to a whole of the continuous area.

9. The information collection method according to claim 8, further comprising:
after the predetermined values are written back to the whole of the continuous area, reading out information used for a boot process of the information processing apparatus, from the storage area other than the area in which the memory leak has occurred;
storing the information in the nonvolatile memory;
turning off and then turning on a power supply of the computer; and
performing the boot process by using the information.

10. The information collection method according to claim 8, wherein
the setting the work area include setting, when the continuous area is found in plurality, a storage area obtained by combining the plurality of continuous areas, as the work area.

11. The information collection method according to claim 10, wherein
the collecting the investigation information includes collecting the investigation information to be collected, from the volatile memory, for each data capacity of the storage area obtained by combining the plurality of continuous areas, temporarily storing the investigation information into the work area, and storing data stored in the work area, into the nonvolatile memory.

12. The information collection method according to claim 7, wherein
the investigation information is provided in plurality, wherein
a priority is given in advance to each of the plurality of pieces of investigation information collected from the volatile memory, wherein
information indicating the priority of the investigation information to be collected is registered in management information in advance, for each operation mode of the computer, and wherein
the collecting the investigation information includes determining the investigation information to be collected from the volatile memory, based on an operation mode of the computer and the management information at a time point when the memory leak has occurred.

13. A non-transitory computer-readable recording medium storing an information collection program that causes a computer including a volatile memory and a nonvolatile memory to perform a procedure comprising:
setting, upon detection of an occurrence of a memory leak, a work area in a storage area of the volatile memory, the work area being different from an area in which the memory leak has occurred; and
collecting investigation information from the area in which the memory leak has occurred and storing the investigation information into the nonvolatile memory by using the set work area, the investigation information being used for investigation of a cause of the occurrence of the memory leak.

* * * * *